United States Patent [19]

Jeanblanc et al.

[11] Patent Number: 5,115,493
[45] Date of Patent: May 19, 1992

[54] CONTINUOUS LASER PRINTER FOR PRINTING OVER PAGE BOUNDARIES

[76] Inventors: Ivan M. Jeanblanc, 225 Chesterfield Industrial Blvd., Chesterfield, Mo. 63005; Stephen E. Hutchison, 234 Old Meramec Station Rd., Ste. D, Manchester, Mo. 63021; Mark K. Virkus, 234 Old Meramec Station Rd., Ste. D, Manchester, Mo. 63021; Ronald J. Johnsen, 234 Old Meramec Station Rd., Ste. D, Manchester, Mo. 63021

[21] Appl. No.: 567,839

[22] Filed: Aug. 15, 1990

Related U.S. Application Data

[63] Continuation-in-part of Ser. No. 541,820, Jun. 21, 1990, and a continuation-in-part of Ser. No. 558,036, Jul. 25, 1990.

[51] Int. Cl.⁵ ................................ G06F 3/12
[52] U.S. Cl. ..................... 395/117; 395/116
[58] Field of Search ........... 364/519, 900; 358/449, 358/498, 453, 450; 355/311, 316

[56] References Cited

U.S. PATENT DOCUMENTS

| | | | |
|---|---|---|---|
| 4,062,061 | 12/1977 | Batchelor et al. | 364/900 |
| 4,383,755 | 5/1983 | Fedder et al. | 355/11 |
| 4,384,297 | 5/1983 | Ohara et al. | 346/108 |
| 4,511,928 | 4/1985 | Colomb | 364/519 X |
| 4,578,572 | 3/1986 | Hice | 235/472 |
| 4,613,877 | 9/1986 | Spencer et al. | 346/160 |
| 4,625,219 | 11/1986 | Horiuchi | 346/108 |
| 4,661,861 | 4/1987 | Rutherford et al. | 358/302 |
| 4,694,405 | 9/1987 | Bradbury et al. | 364/518 |
| 4,712,118 | 12/1987 | Seto et al. | 346/108 |
| 4,760,406 | 7/1988 | Sato et al. | 346/33 R |
| 4,795,281 | 1/1989 | Ulinski, Sr. et al. | 400/74 |
| 4,805,135 | 2/1989 | Ochi et al. | 364/519 X |
| 4,847,641 | 7/1989 | Tung | 346/154 |
| 4,855,754 | 8/1989 | Tanaka et al. | 346/17 |
| 4,977,519 | 12/1990 | Chang et al. | 364/519 |
| 4,992,956 | 2/1991 | Kaku et al. | 364/519 |
| 4,992,958 | 2/1991 | Kageyama et al. | 364/519 |
| 4,998,216 | 3/1991 | Hino et al. | 364/519 |

Primary Examiner—David L. Clark
Attorney, Agent, or Firm—Senniger, Powers, Leavitt & Roedel

[57] ABSTRACT

Central processing unit, responsive to the commands and print data signals, selectively stores the reference pattern signals from a pattern memory into a page memory. The central processing unit provides the first page pattern signal stored in the page memory to the laser printer engine for use in printing the first page while simultaneously providing the second page pattern signals from the pattern memory to the page memory to build the second page in the page memory. After the first page pattern signals have been provided to a laser printer engine, the central processing unit provides the second page pattern signals stored in the page memory to the laser printer engine for printing while simultaneously providing the subsequent page pattern signals from the pattern memory to the first page memory to build the subsequent page in the page memory. A bus interconnects the computer and the central processing unit, the pattern memory and the page memory and the page memory and the laser printer engine.

31 Claims, 2 Drawing Sheets

CONTINUOUS LASER PRINTER FOR PRINTING OVER PAGE BOUNDARIES

CROSS-REFERENCE TO RELATED APPLICATION

This application is a continuation-in-part of copending application Ser. No. 07/541,820, filed June 21, 1990 and continuation-in-part application Ser. No. 07/558,036, filed Jul. 25, 1990.

BACKGROUND OF THE INVENTION

The invention generally relates to laser printers and, in particular, a continuous laser printer which can print successive forms of varying lengths.

Laser printers using the xerography process are well known in the prior art such as disclosed in U.S. Pat. Nos. 4,383,755 and 4,384,297. In addition, video signal generators for laser printers such as disclosed in U.S. Pat. No. 4,625,219 are also well known in the prior art. Such generators include a dot counter which counts the dots along the horizontal side of the recording area and a raster counter which counts the dots along the vertical side of the recording areas. In accordance with the outputs of these counters, a character pattern memory produces a character print dot signal, while a set value representing a ruled line size is calculated from the outputs of the dot counter and the raster, thus producing a ruled line signal. These two signals are combined to make up a video signal.

In general, such printers and video signal generators for controlling them are unable to print across page boundaries and must define pages having margins on all four sides. This approach unnecessarily limits the ability of the printer to print continuously or to print on pages of varying size.

SUMMARY OF THE INVENTION

It is an object of this invention to provide a continuous laser printer which can successively print forms of varying length.

It is another object of this invention to provide a control circuit for a continuous laser printer which interfaces between a host computer and the printer itself to permit the printer to print continuously.

It is another object of this invention to provide such a control circuit which prints a page while the next page to be printed is simultaneously being built in memory.

It is another object of this invention to provide a laser printer which can continuously print bar codes.

The apparatus according to the invention controls a laser printer engine in response to commands and print data signals provided by a host computer representing patterns to be printed by the laser printer engine. A pattern memory stores signals which represent reference patterns. A page memory stores signals which represent patterns on a first page to be printed and patterns on a second and subsequent pages to be built.

Central processing means, responsive to the commands and print data signals, selectively stores the reference pattern signals from the pattern memory into the page memory. The central processing means provides the first page pattern signal stored in the page memory to the laser printer engine for use in printing the first page while simultaneously providing the second page pattern signals from the pattern memory to the page memory to build the second page in the page memory. After the first page pattern signals have been provided to the laser printer engine, the central processing means provides the second page pattern signals stored in the page memory to the laser printer engine for printing while simultaneously providing the subsequent page pattern signals from the pattern memory to the first page memory to build the subsequent page in the page memory. Means interconnects the computer and the central processing means, the pattern memory and the page memory and the page memory and the laser printer engine.

Other objects and features will be in part apparent and in part pointed out hereinafter.

BRIEF DESCRIPTION OF THE DRAWINGS

Corresponding reference characters indicate corresponding parts throughout the several view of the drawings.

DETAILED DESCRIPTION OF THE PREFERRED EMBODIMENTS

Figure 1:
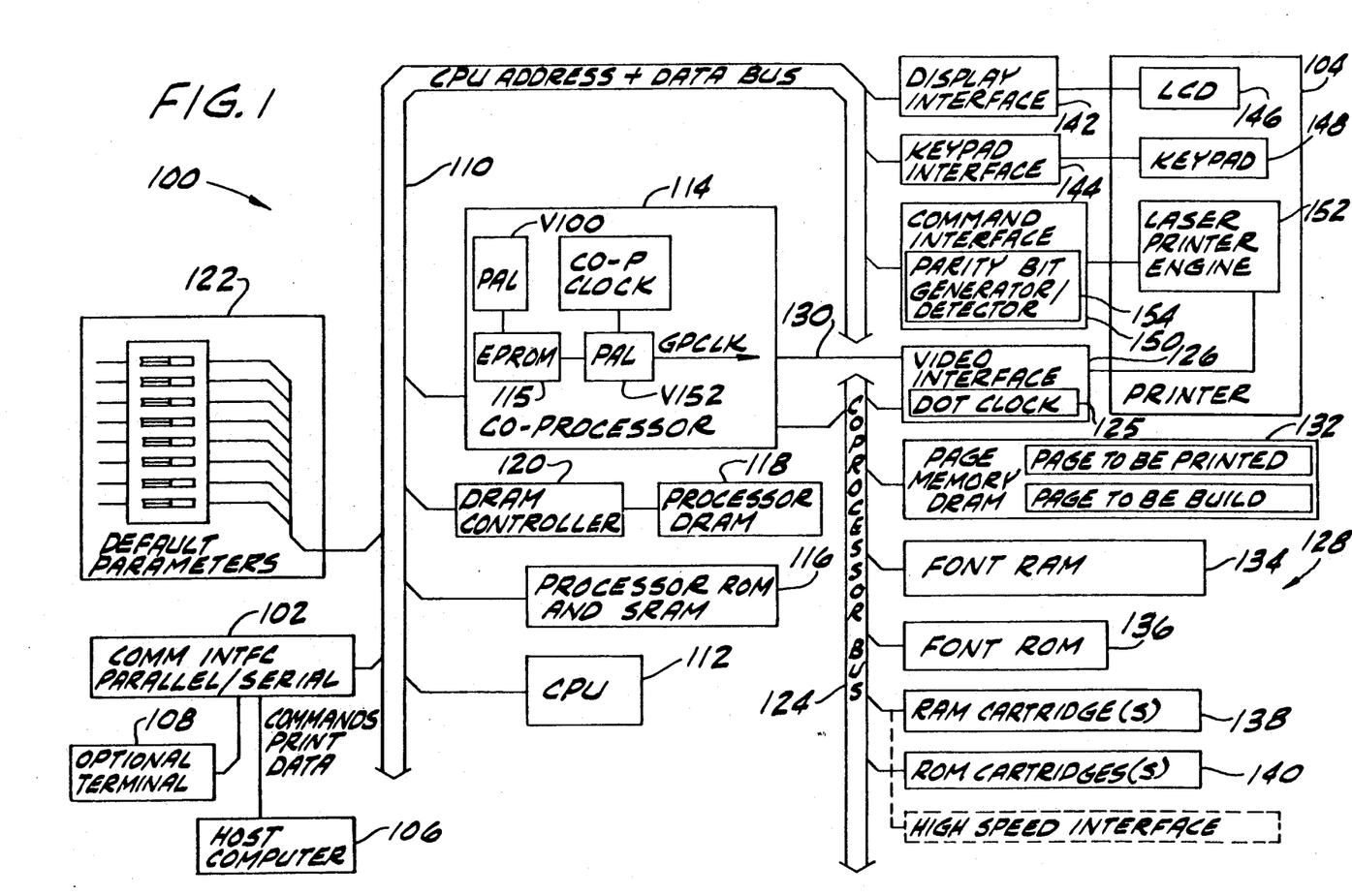
FIG. 1 is a block diagram of one preferred embodiment of a controller according to the invention for use between a host computer and a laser printer.

FIG. 1 is a block diagram illustrating one preferred embodiment of the invention. Reference character 100 generally refers to the invention, which is illustrated as a control circuit 100 between a communications interface 102 such as a serial or parallel interface and a laser printer 104. For example, laser printer 104 may be a Pentax Model No. PL-F0301 or any other laser printer well known in the prior art available as an off-the-shelf item. Such laser printers require a control circuit 100 which permits it to connect to the communication interface 102. The communication interface 102 is connected to a host computer 106 and receives commands and print data information which instruct the operation of the laser printer 104. Optionally, a terminal 108 may be connected to the communication interface 102 to provide diagnostic information regarding the operation of the system. Therefore, control circuit 100 constitutes an apparatus for controlling a laser printer 104 in response to commands and print data signals provided by a host computer 106 representing patterns to be printed by the laser printer 104.

As will be apparent to those skilled in the art, communication interface 102 may be directly connected to a bus such as a CPU address and data bus 110. As illustrated in FIG. 1, a central processing unit (CPU) 112 is connected to bus 110 for controlling system operation. Alternatively, communications interface 102 may be directly connected to CPU 112 depending on the selected architecture of the CPU. For example, if the CPU is a Motorola MC68302 RC16, it has an external address and data bus with additional interfaces which internally connect to the bus.

The central processing unit 112 controls the processing of information between the communications interface 102 and the laser printer engine 104. In particular, CPU 112 interprets commands provided by the host computer 106 via the communications interface 102 onto bus 110 and instructs a co-processor 114 to take a particular course of action. In summary, depending on the type of architecture of the processors and the bus, the communication interface 102 may be directly connected to the bus 110 or the CPU 112. The CPU 112, therefore, can operate on separate data and address buses or on an integrated bus as illustrated in FIG. 1.

Also connected to bus 110 is a processor read only memory (ROM) and static random access memory (SRAM) 116. As is well known, static RAM may be directly connected to the address and data bus 110 for access by CPU 112. In addition, processor dynamic random access memory (DRAM) 118 is also connected to the address and data bus 110 via DRAM controller 120. Controller 120 periodically refreshes the memory of processor DRAM 118.

Co-processor 114 is treated as a peripheral device as far as CPU 112 is concerned. Co-processor 114 has a certain area in the address map that is used to access the co-processor via bus 110.

Also connected to CPU address and data bus 110 is a bank of switches 122 which specify the default parameters of the control circuit 100. The position of the switches indicate to the CPU 112 the various default parameters such as the baud rate of the communications interface, the memory capacity of the control circuit 100, and any other operating parameters which may need to be specified with regard to relationship between the control circuit and the communications interface 102.

Co-processor 114 is connected to a co-processor address and data bus 124 for accessing the various memories connected thereto. When the laser printer 104 needs more data, the following sequence is executed. A video interface 126 is provided between the co-processor bus 124 and the laser printer engine 152. The laser printer engine 152 alerts the co-processor 114 via the video interface 126 that more data is needed. In response to this alert, the co-processor 114 will access a page memory 132 to make certain information in the memories available via the co-processor bus 124. The page memory 132 includes patterns transferred from a pattern memory 128 to the page memory 132 by the co-processor 114. The pattern memory includes font RAM 134, font ROM 136, RAM cartridges 138 and ROM cartridges 140. The information is not directly brought into the co-processor 114 but is simply made available to the laser printer engine 152 on the co-processor bus 124. This allows the video interface 126 to access the additional data available on the co-processor bus and deliver it to the laser printer 104. Line 130 directly connects co-processor 124 and the video interface 126 to allow communication therebetween. Essentially, a hand-shaking operation occurs between the co-processor 114 and the video interface 130 to permit the continuing delivery of data to the laser printer engine 152.

Page memory 132 has the capacity for storing two pages of information, a first page of signals representing patterns on the page being printed and a second page of signals representing patterns on the next page being built. Essentially, while the one page is being printed, the next page is simultaneously being built. The page building process is controlled by co-processor 114 and completed by the time that the printing process is completed so that the built page becomes the next page to be printed. The memory locations of the page of information which has been completely printed then becomes the memory locations of the next page to be built. This alternating process of printing one page while simultaneously building the next page to be printed allows the control circuit 100 to control the laser printer 104 to provide a continuous printing operation.

Therefore, CPU 112 constitutes central processing means, responsive to the commands and print data signals of host computer 106, for selectively storing the reference pattern signals from the pattern memory 128 into the page memory 132, wherein the central processing means provides the first page pattern signals stored in the page memory 132 to the laser printer 104 for use in printing the first page while simultaneously providing the second page pattern signals from the pattern memory 128 to the first page memory to build the second page in the page memory 132. After the first page pattern signals have been provided to the laser printer 104, the central processing means provides the second page pattern signals stored in the page memory 132 to the laser printer 104 for printing while simultaneously providing the subsequent page pattern signals from the pattern memory 128 to the page memory 132 to build the subsequent page in the page memory 132. Buses 110 and 124 constitute means for interconnecting the host computer 106 and the CPU 112, for interconnecting the pattern memory 128 and the page memory 132, and for interconnecting the page memory 132 and the laser printer engine 152.

Also connected to the CPU address and data bus 110 are display interface 142 and keyboard interface 144. In general, the laser printer 104 includes an LCD display 146 indicating the status of the printer operation. In addition, the laser printer 104 includes a keypad 148 which can be used to control the operation of the laser printer. An operator uses keypad 148 to enter information into the system via keypad interface 144. This information is interpreted by CPU 112 and is used to control the laser printer engine 152 to print documents. Therefore, both the display interface 142 and the keypad interface 144 permit an operator to enter additional information into the control circuit 100.

Control circuit 100 also includes a command interface 150 between the CPU address and data bus 110 and the laser printer engine 152 which delivers command signals to the laser printer engine 152 for controlling its printing operation. The command interface 150 includes a parity bit generator/detector 154, the operation of which will be described below with regard to FIG. 2.

Data is provided to the laser printer engine 152 for printing via the video interface 126 as supplied on the co-processor bus 124. Essentially, the video interface 126 is a bank of shift registers for latching the data from the laser printer engine 152.

Co-processor 114 accesses various reference information in order to build a page in page memory 132 while a page is being printed from page memory 132. This information is stored in any one or more of the various pattern memories 128 which are connected to the co-processor bus 124. In particular, font ROM 136 includes the basic pattern memory which stores the basic patterns which will be used by the co-processor 114 to print various characters such as bar codes. In addition, font RAM 134 is provided with specialized characters or fonts which may be downloaded from the host computer 106 for accessing by co-processor 114. Finally, slots are provided for receiving additional RAM cartridges 138 and additional ROM cartridges 140 for expanding both the font RAM and font ROM storage capability.

OPERATION OF THE FIG. 1 EMBODIMENT

Initially the host computer 106 sends command signals to the control circuit over the parallel or serial communications interface 102. The invention contemplates that a large number of commands are supported so as to provide flexibility in the operation of printer 104. Some of the essential information which would be communicated from the host computer 106 would include the following:

- font sets to be downloaded from the host computer 106 into font RAM 134;
- the position of the page to be printed with respect to the edge margins of the paper;
- the page layout, i.e., portrait or landscape;
- the particular type of font style which will be used;
- the particular character or image from the font set to be printed; and
- accounting information such as the number of copies to be printed.

Next, the CPU 112 interprets the commands provided on the bus 110. Based upon the particular commands being provided by the host computer 106, different activities will occur. Generally, the CPU 112 will interpret the commands and instruct the co-processor 114 to perform certain activities, i.e., the manipulation of data. While this is happening, pages are being printed by the laser printer engine 152 so that page build-up and printing are occurring simultaneously. The co-processor 114 is organizing pages to be printed and, at the same time, accepts new information which has been interpreted by the CPU 112 to determine the next page to be built.

If new font sets are being downloaded from the host computer 106 to the font RAM 134, the CPU 112 instructs the co-processor 114 as to the location (address) in font RAM 134 to store the incoming bit patterns. The CPU 112 also sets up a table in the processor SRAM memory 116 recording the font description information and location in font RAM 134 of the stored pattern.

If print information is being downloaded from the host computer 106, the CPU 112 examines the table in the processor SRAM memory 116 indicating the locations in the pattern memory 128 of the characters to be printed. The CPU 112 also interprets the physical location on the print page that the information is to be printed. The CPU 112 then writes this source and destination information to the co-processor 114 which, in turn, transfers the bit map to be printed from pattern memory 128 to page memory 132.

CPU 112 handles portrait and landscape commands in a similar fashion as it handles font set commands. Portrait and landscape print styles each have separate fonts stored in pattern memory 128. The bit map patterns for portrait and landscape styles stored in font memory 128 are fonts which are rotated versions of each other. Storing separate portrait and landscape fonts reduces the computation burden of the CPU 112 and co-processor 114, and hence, maximizes throughput. Most font characters are portrait style. Landscape font characters are downloaded or stored in font RAM 134 only as needed, i.e., there is not necessarily a one to one mapping of resident portrait and landscape font sets.

The CPU 112 is constantly monitoring and interpreting the user inputs and the status of the engine 152. It also controls the LCD display 146 via the display interface 142 to indicate to the user information representing printer status. The CPU 112 communicates with the engine 152 via the serial command interface 150 including several dedicated hand-shake lines. This provides both the CPU 112 and the engine 152 the ability to communicate status and timing information which both components need to properly coordinate their operation and control continuous page printing. For example, CPU 112 verifies that the laser printer engine 152 is warmed up and ready to print, that it is operating or prepared to operate at the proper speed, and that the keypad 148 indicates that the engine 152 is on-line and ready to print.

As long as the CPU 112 determines by monitoring that the laser printer engine 152 is ready to print or printing and determines that the status of engine 152 is operational, the co-processor 114 continues to print the page that it is printing while building the next page. Initially, CPU 112 releases co-processor 114 to allow page printing. At that point, the video interface 126 between the co-processor 114 and the laser printer engine 152 takes over. When the laser printer engine 152 indicates that it is ready to start printing the top of the page, co-processor 114 begins making available on the co-processor bus 124 signals which can be used by the engine 152 to print the page. At the end of each line, the laser printer engine 152 will signal the coprocessor 114 to make the next line of data available for printing. In effect, the hand-shape operation occurs on a line-by-line sequence.

Video interface 126 synchronizes the engine 152 and co-processor 114 to their respective page printing tasks. Co-processor 114 transmits in real time the bit pattern to be printed over a serial line. The dot clock 125 of video interface 126 provides the timing reference for this serial data transfer. To avoid line-to-line variations in print position, the dot clock is phase locked with the line sync signal which is an output from the engine 152 triggered as the laser scans across an optoelectronic device at the onset of each new print line.

The page memory 132 accessed by co-processor 114 is sufficiently large to store the bit patterns for two complete print pages. This memory is divided into two sections, one section holding the page currently being printed and the other section holding the page currently being built. Co-processor 114 concurrently prints the present page and builds the next page. The co-processor 114 must complete the building of the next page by the time the current page is fully printed. At such time, the co-processor 114 reverses the rolls of the two memory sections and repeats the simultaneous process of printing and building a page. Employing separate page building and page printing memory areas within page memory 132 allows CPU 112 the freedom to randomly access areas of the page under construction without any concern of overriding the page under print. This, in turn, allows the CPU 112 to make more than one pass across a page during page building. For example, if the page being built consists of bar codes and text, the controller can map all the bar codes into memory and then all the text.

One important aspect of the invention includes the ability of CPU 112 to stretch the clock of co-processor 114 to allow sufficient time to access the slower EPROM devices such as font ROM 136 without compromising the faster access time of the font RAM 134 devices. This feature maximizes the system throughput for a given memory configuration. A programmable array logic (PAL) U100 decodes the co-processor address lines on bus 124 and asserts an EPROM 115 if the read only memory 136 is being accessed. With the EPROM 115 asserted, PAL U152 retains the co-processor clock pulse GPCLK in its present state for a predetermined number of buffered system clock cycles (DSCLK*) to swallow the clock pulses, after which time GPCLK reverts back to its normal clock rate. Therefore, PAL U100 constitutes means for adjusting the clock rate.

Figure 2:
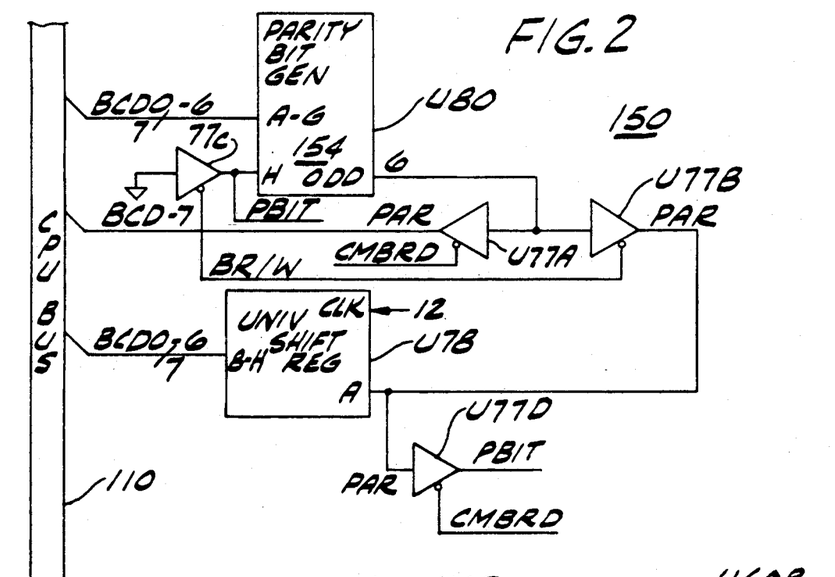
FIG. 2 is a block diagram of one preferred embodiment of the command interface according to the invention shown in FIG. 1.
Figure 3:
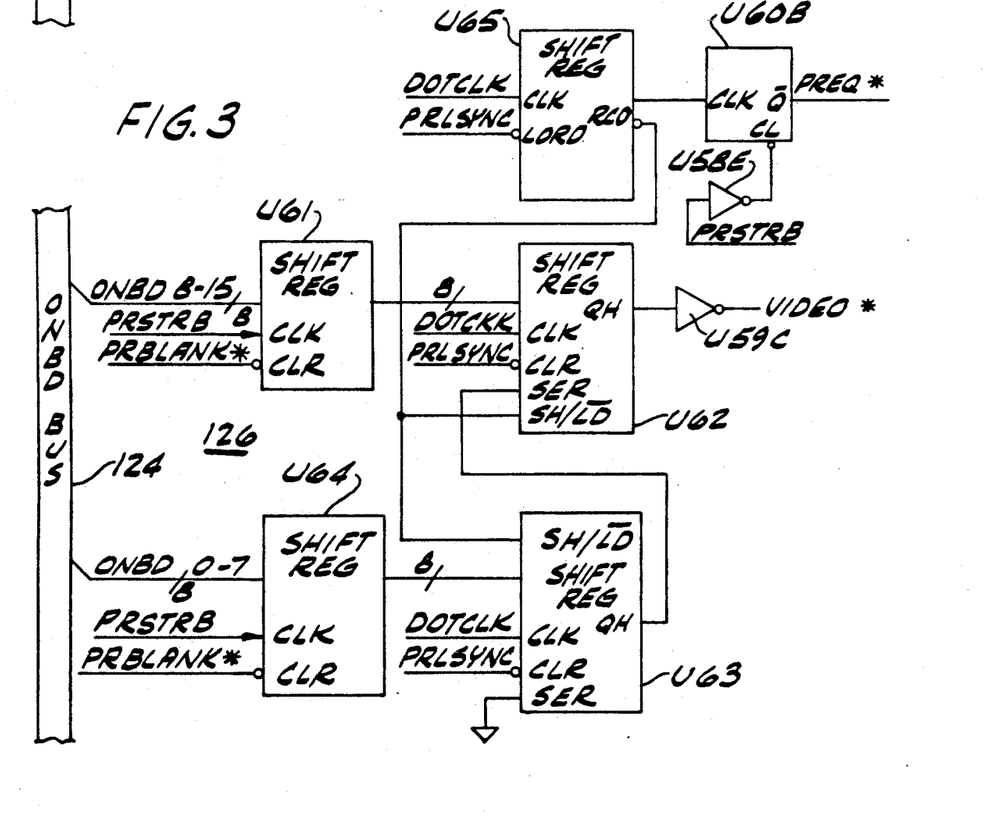
FIG. 3 is a block diagram of one preferred embodiment of the video interface according to the invention shown in FIG. 1.

FIGS. 2 AND 3

The command interface 150 is shown in greater detail in FIG. 2. Reference character U78 refers to a universal shift register having the ability to both convert a parallel input to a serial output or a serial input to a parallel output. A parity bit generator U80 constitutes means for generating parity bits provided to the laser printer engine 152 and for detecting parity bits provided by the laser printer engine 152, i.e., generator U80 generates a logic one or logic zero based upon the number of logic one levels at inputs A-H thereof. Reference characters 77A-77D refer to various portions of a hex tri-state buffer U77. If the enable line of any one of these buffers is asserted, a logic level at the output is equal to the logic level at the input. If the enable line is not asserted, the output is in a high impedance state. In this unasserted state, the buffer appears to other devices connected to its output as having been removed from the circuit.

When a byte is to be transmitted from CPU 112 to engine 152, buffers U77B and U77C are enabled by a BR/W signal while buffers U77A and U77D are disabled. The seven least significant data bits are placed on the data bus BCD 0-6. Generator U80 generates a parity bit PAR at pin 6. This bit is connected to input A of register U78 through buffer U77B. Register U78 then latches inputs A-H followed by eight clock (CLK) pulses being issued to register U78, pin 12. These pulses in turn shift the latch data out of register U78 into the engine 152.

When a byte is to be received from the engine 152, buffers U77B and U77C are disabled while buffers U77A and U77D are enabled by a CMDRD signal. Eight clock pulses are then issued to pin 12 of register U78, in turn shifting latched data into register U78 from the engine 152. Outputs B-H or register U78 are then placed directly on the BCD data bus, and output A is connected to output H of generator U80 through buffer U77D by a PBIT signal. Generator U80 generates a parity bit PAR and places it on line BCD 7 of the BCD data bus. CPU 112 reads the BCD data bus. If the bit on line BCD 7 is a logic zero, the processor 112 knows that the data is valid. If a logic one appears on line BCD 7 of the BCD data bus, the data is assumed invalid and the controller 112 will request that the engine 152 retransmit the information. With this command interface 150, CPU 112 is relieved of the software task of generating and detecting parity.

FIG. 3 illustrates the video interface 126. Co-processor 114 (not shown in FIG. 3) provides a PRSTRB signal which is asserted when valid print data is available on the co-processor bus 124, in turn latching this data into registers U61 and U64. The RCO output of register U65 clocks these latch outputs into shift registers U62 and U63 every sixteen dot clock cycles. After eight dot clock cycles, line PRREQ* is asserted, alerting co-processor 114 to place another word of print data onto the ONBD co-processor bus 124. Line PRSTRB is then asserted and the process is repeated. Line PRSTRB also deasserts line PRREQ* via buffer U58E.

Line PRBLANK* is an output from the co-processor 114 which, when asserted, forces the video interface 126 to transmit zeros to the engine. This guarantees that a blank area of the page is printed while PRBLANK* is asserted. Line PRBLANK* accomplishes this task by clearing latches U61 and U64. Each of registers U62, U63 and U65 is cleared by a PRLSYNC generated by the engine 152 at the start of each new line in response to the optoelectric sensor which detects each new line.

One significant feature of the invention is the ability to print continuous information across page boundaries. One important advantage of continuous printing according to the invention is the ability to print labels. In general, labels are physically arranged in a wide variety of shapes and sizes. Relatively few labels fit within a standard 11 inch or 14 inch repeat for which most laser printer engines are designed. In order to handle labeling applications, the invention can handle various repeats other than the standard 11 or 14 inch repeat without any material waste or label skipping. Specifically, the paper appears to the laser printer engine as a continuous roll without any perforations or page boundaries.

Generally, laser printer engines 152 are built around a standard page length of 11 inches and, as a result, the printed area is limited to an area which is less than the full 11 inch length. For example, the Pentax engine noted above recommends a 1/6 inch dead band at the top and bottom of every page. Accordingly, the control circuit according to the invention overcomes this restriction and allows printing over the entire page. At 300 dot rows per inch there would be 100 blank dot rows from the bottom of one page to the first printable line of the next page. Depending upon the speed of the engine, this translates into approximately 114 milliseconds of idle time which is generally used by the CPU to set up the next page to be printed. According to the invention, these normally blank dot rows are used for normal printing. As a result, the CPU is configured to switch pages within only one dot row in time. This also requires that characters printed across the virtual page boundaries must be split across the first and second page memories of page memory DRAM 132. The ability to switch pages within one dot row at a time (approximately 1.1 milliseconds) is achieved by the selection of CPU 112 and co-processor 114 as noted above along with extensive use of Prioritized interrupt processing. In particular, the CPU 112 is programmed with the priority of the various interrupt signals with the co-processor interrupt signal having the highest priority.

Generally, real time computer applications use interrupts extensively to insure timely response to external events. In many cases, these external events have priorities associated with them and as such, it is desirable to respond to them in the order of their importance. The microprocessor 112 used in laser printer controller 100 assigns several levels of interrupt priorities. The processor 112 divides interrupts in general into seven levels with level 0 being lowest and level 7 being highest. In addition to this general Classification, there are several interrupt sources internal to the processor itself which are associated with internal peripherals such as timers and serial 1/0.

In the system, the highest priority interrupt is caused by loss of power. In the event of power loss, a message will be sent to the host computer 106 before the printer engine 104 becomes inoperative, allowing the host to stop sending information needlessly to an unpowered printer, 104. The next highest priority interrupt is a request from the engine 104 to provide a Vertical SYNC signal. This is the signal that the paper is at top of form and a page must be imaged. The next interrupt is the PRINT DONE interrupt. This is the signal that a page has been completed. This is a very important event in the process of printing labels as controller 100 must respond in a very timely manner (approximately 1 millisecond) to begin printing the next portion of a label or a void will appear in the label.

All other interrupts in the system are of lower priority than the above interrupts which means that while the processor 112 is responding to a high priority event, it must complete any processing necessary for that event before it attends to a lower level interrupt. For example, a front panel key closure during the page switch during label printing is a lower priority interrupt. A key closure is a relatively long lived event (human response time is approximately 100 milliseconds) and can therefore be delayed a bit until the more time critical event of switching from one bank of images to another is completed.

The splitting of characters across virtual page boundaries can be avoided by resizing the page memory 132 dedicated to the page to be printed or the page to be built to hold an image corresponding to an appropriate multiple of the labels. This obviates the need for the split characters across the two pages in question. However, the nearly infinite variety of label sizes make it difficult to come up with an appropriate page memory bank size. This is especially true with very long labels are desired to be printed. In one preferred embodiment of the invention, characters which would be printed on the virtual page break are split into partial characters, each portion residing in the appropriate memory bank.

Clipping the characters at the bottom of the page being printed is a matter which is handled by co-processor 114. In general, the total number of lines allowed in an image is specified and the co-processor automatically clips any portion of an image outside the specified boundaries.

Clipping characters at the top of a page is determined by calculating what portion of a character falls above the current page. CPU 112 then calculates an offset into the bit map of the character to be imaged and calculates the reduced bit map size. The CPU 112 programs the co-processor 114 with this modified information.

Each label being printed in a particular run may have different information on it. If such is the case, it is important to avoid any memory shortages. A run of labels of different information normally does not present a memory shortage problem until the roll of labels being printed crosses a virtual page boundary. Due to the fact that the first page pattern memory 132 is being printed while the second page pattern memory is being imaged a problem might arise as follows. The bottom portion of the labels of the first page that must be split cannot be imaged until the previous page has been printed. Therefore, the information on these labels must be stored in memory until the buffer is free. Since each of these labels may be different, each label must be saved separately. If this approach is used, a significant amount of additional memory is needed or a memory shortage may occur. In order to minimize the memory usage in this scenario, a count of each label with identical contents is kept by CPU 112 and used to repeat these labels without requiring a separate memory for each instance that the label appears.

Paper speed error is detected by the difference between the number of lines fed by the engine 152 as compared to the number of lines printed by the engine 152. For example, an 11 inch page should have 3300 lines if there are 300 lines per inch. However, if the paper is fed faster than the print rate, the page may only have 3285 lines when the end of the page is reached.

In order to print labels of various size, the page buffers of page memory 132 must be set up to hold an integral multiple of label repeats, such that each of the "page to be printed" buffer and the "page to be built" buffer is greater than or equal to 11 inches of memory. This allows determination of the number of lines of print that "spill" over from one page to another due to paper speed error. This information is available at every VSREQ (Vertical Sync REQuest) signal. Since the page buffer size is matched to the label repeat, when the "print done" interrupt occurs, it is assumed that the next few lines are actually in the inter-label gap and therefore contain white space. Any error due to paper speed fluctuation detected at the last VSREQ can then be made up in the white space.

Typically, the paper tends to move too fast, resulting in lines that were to be printed on the previous page being printed on the next page. This causes the engine 152 to request for VSYNC earlier than expected which can be detected and quantified by reading a PRLINECNT (print line counter) register maintained by coprocessor 114.

In systems according to this invention which do not print labels of varying size, a "print done" condition is forced by the coprocessor 114 in response to a VSYNC signal. The VSYNC signal is generated by the printer engine 152 in response to signals provided by an encoder on the paper feeder. The VYSNC signal is provided to coprocessor 114 via the command interface 150 and bus 110. For example, the encoder provides a feed signal for every half inch of paper being fed. The "print done" condition eliminates any unprinted lines in the buffer of the printing page and printing continues with the next page in the other buffer. This causes printed information spanning the "virtual" perforation to be distorted by the loss of lines which are eliminated. In effect, the printed information appears to be compressed. It also requires explicit erasure of the lines that were "eliminated".

In systems according to the invention which print labels of varying size, CPU 112 records the information, and, using an algorithm, generates a VSYNC signal and continues printing. When the "print done" interrupt is generated by the coprocessor 114 at the end of the modified page length, i.e., N label lenths, the PRLINESTRT (PRint LINE STaRT) register maintained by the coprocessor 114 is adjusted to start on a line further down in the next image buffer, effectively eliminating lines that contain only blanks. For example, suppose that the VSYNC signal is generated at 3295 lines. Printing is adjusted to skip the first five lines and start on line 6 of the next buffer to compensate for the varying page length. As a result, at the end of the printing of the next page, the VSYNC will closely correspond to the end of the modified page. In order to prevent printed information from being skipped, it is preferable to establish a rule requiring at least 15 blank lines or 1/20th of an inch of blank lines at the start and end of each modified page length, i.e., at the end of N label lengths.

If the opposite condition occurs where a VSYNC signal is later than expected, the coprocessor 114 inserts some extra blank lines. This is accomplished by the coprocessor 114 by using the register for generating a top margin. This top margin register is programmed to the error count detected at the last VSYNC and automatically generates blank lines equal to the error count before actual data to be printed. This effectively moves the real data further down the page making up for the error in the engine feeding speed as compared to the engine printing speed.

In an alternative preferred embodiment of the system according to the invention which prints labels of varying size, CPU 112 responds directly to the encoder signals representing the length of paper being fed. The CPU 112 records the information and, using an algorthim, corrects for paper speed error after each label. Coprocessor 114 includes a register which counts label length and generates a "label done" interrupt at the end of the label. When the "label done" interrupt is generated by the coprocessor 114 at the end of the label, the coprocessor 114 starts on a line further down in the image buffer being printed, effectively eliminating lines between labels that contain only blanks. For example, suppose that the label interrupt signal is generated after 500 lines of paper feeding as a result of printing a top margin of 50 lines and a label of 445 lines resulting in a five (5) line paper speed error. Printing is adjusted to skip the next five lines in the image buffer being printed and start thereafter to compensate for this five (5) line paper speed error. As a result, at the end of the printing of the page, the VSYNC will closely correspond to the end of the page. In order to prevent printed information from being skipped, it is preferable to establish a rule requiring at least 15 blank lines or 1/20th of an inch of blank lines at the start and end of each label. However, this rule is not essential because most labels have borders in which lines can be deleted or added without significant modification to the label.

If the opposite condition occurs where a label interrupt signal is later than expected, the coprocessor 114 inserts some extra blank lines between the label. This is accomplished by the coprocessor 114 by using the register for generating a top margin. This top margin register is programmed to the error count detected at the last VSYNC and automatically generates blank lines equal to the error count before actual data to be printed. This effectively moves the real data further down the page making up for the error in the engine feeding speed as compared to the engine printing speed. As an alternative, "free zones" within a label can be identified in which case paper feed error corrections can be made in the free zone by deleting or duplicating lines therein. Generally, a "free zone" would be a horizontal strip within the label having little or no text.

The requirements for printing labels of various size also effects other system components. In order to handle the most popular label sizes, a buffer that can hold two (2) 22" pages is required. This requires a buffer size of 3,960,000 bytes (2 pages * 22" * 300 lines/inch * 300 bytes per line). In one preferred hardware configuration, there are two 2M image buffers that are not contiguous. PAL U152 of the coprocessor 114 enables the entire 4M of memory to be one continuous pool.

In order to allow downloaded fonts, a memory management system which permits allocation of coprocessor memory 134 for various uses is implemented. Since the image buffers are originally fixed in size, the memory management setup routine is standard. With variable length image buffers, the sizing/allocation routines for the coprocessor memory 134 are modified to allow for the variable buffer length. This also requires mandatory deletion of all downloaded fonts in the font RAM 134 if the label size changes in such a way as to cause the image buffer to increase in size.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. An apparatus for controlling a laser printer engine in response to commands and print data signals provided by a computer representing patterns to be printed by the laser printer engine, said apparatus comprising:
   a pattern memory in which signals representing reference patterns are stored;
   a page memory in which signals representing patterns on a first page to be printed are stored and in which signals representing patterns on second and subsequent pages to be built are stored;
   central processing means, responsive to the commands and print data signals, for selectively storing the reference pattern signals from the pattern memory into the page memory, wherein said central processing means provides the first page pattern signals stored in the page memory to the laser printer engine for use in printing the first page while simultaneously providing the second page pattern signals from the pattern memory to the page memory to build the second page in the page memory and, after the first page pattern signals have been provided to the laser printer engine, said central processing means provides the second page pattern signals stored in the page memory to the laser printer engine for printing while simultaneously providing the subsequent page pattern signals from the pattern memory to the first page memory to build the subsequent page in the page memory wherein the laser printer engine defines virtual page boundaries and said central processing means includes means for splitting a reference pattern to be printed on one of the virtual page boundaries between the first and second pages; and
   means for interconnecting the computer and the central processing means, for interconnecting the pattern memory and the page memory, and for interconnecting the page memory and the laser printer engine.

2. The apparatus of claim 1 wherein said means for interconnecting comprises a first bus interconnecting the computer, the central processing means and the laser printer engine; and
   wherein said first bus carries the command and print data signals from the computer to the central processing means.

3. The apparatus of claim 2 wherein said means for interconnecting further comprises a second bus and further comprising means for interconnecting the first and second buses, said second bus interconnecting the pattern memory, the page memory, and the laser printer engine, wherein said second bus carries reference patterns signals from the pattern memory to the page memory and said bus carries the first, second and subsequent page pattern signals from the page memory to the laser printer engine.

4. The apparatus of claim 3 wherein said pattern memory further comprises a font ROM connected to the second bus for storing reference patterns signals representing preselected fonts.

5. The apparatus of claim 4 wherein the font ROM includes bar code and text fonts.

6. The apparatus of claim 5 wherein the page memory comprises a DRAM for storing bar codes.

7. The apparatus of claim 3 wherein the means for interconnecting the first and second buses comprises a co-processor connected between the first and second buses.

8. The apparatus of claim 3 further comprising a video interface between the pattern memory and the laser printer engine.

9. The apparatus of claim 8 wherein the video interface comprises an array of registers for latching data from the pattern memory to the laser printer engine.

10. The apparatus of claim 2 further comprising a command interface between the first bus and the laser printer engine including means for generating parity bits provided to the laser printer engine and for detecting parity bits provided by the laser printer engine.

11. The apparatus of claim 1 wherein the pattern memory includes means for receiving additional memory cartridges for expanding the pattern memory.

12. The apparatus of claim 11 wherein the means for receiving includes means for interfacing with a communications system.

13. The apparatus of claim 1 wherein the page memory includes means for receiving additional memory cartridges for expanding the page memory.

14. The apparatus of claim 13 wherein the means for receiving includes means for interfacing with a communications system.

15. The apparatus of claim 1 wherein said pattern memory includes read only memory (ROM) and random access memory (RAM), wherein said central processing means includes a clock for clocking reference pattern signals from the ROM and the RAM to the page memory, and further comprising means for adjusting the rate of the clock in response to whether the central processing means is storing into the page memory reference pattern signals from the ROM or from the RAM.

16. The apparatus of claim 1 wherein the central processing unit is responsive to interrupt signals and said central processing unit includes means for prioritizing interrupt signals of the apparatus.

17. The apparatus of claim 1 further comprising a video interface between the pattern memory and the laser printer engine and wherein said central processing unit comprises a microprocessor and a co-processor controlled by the microprocessor for controlling the video interface and for supplying data from the memories to the laser printer engine.

18. The apparatus of claim 17 wherein the microprocessor is responsive to interrupt signals and said microprocessor includes means for prioritizing interrupt signals of the apparatus with interrupt signals of the co-processor being provided with the highest priority.

19. The apparatus of claim 1 wherein said central processing unit includes means for switching between the first page pattern memory to the second page pattern memory during the printing of the last dot row of the first page.

20. The apparatus of claim 1 for printing labels wherein said central processing unit includes means for counting each label to be printed with identical patterns and wherein only one representation of each such label is stored in the page memory.

21. An apparatus for controlling a laser printer engine in response to commands and print data signals provided by a computer representing patterns to be printed by the laser printer engine, said apparatus comprising:
    a pattern memory in which signals representing reference patterns are stored;
    a page memory in which signals representing patterns on a first page to be printed are stored and in which signals representing patterns on second and subsequent pages to be built are stored;
    central processing means, responsive to the commands and print data signals, for selectively storing the reference pattern signals from the pattern memory into the page memory, wherein aid central processing means provides the first page pattern signals stored in the page memory to the laser printer engine for use in printing the first page while simultaneously providing t he second page pattern signals from the pattern memory to the page memory to build the second page in the page memory and, after the first page pattern signals have bee provided to the laser printer engine, said central processing means provides the second page pattern signals stored in the page memory to the laser printer engine for printing while simultaneously providing the subsequent page pattern signals from the pattern memory to the first page memory to build the subsequent page in the page memory wherein the central processing means includes means for determining the difference between the length of a page being fed by the printer engine as compared to the length of the number of lines being printed by the printer engine as the page is being fed and means for adjusting the length of the next page to be printed in response to the difference; and
    means for interconnecting the computer and the central processing means, for interconnecting the pattern memory and the page memory, and for interconnecting the page memory and the laser printer engine.

22. The apparatus of claim 21 wherein the means for adjusting comprises means for deleting the difference from the next page when the length of the page being fed is greater than the length of the number of lines being printed and means for adding the difference to the next page when the length of the page being fed is less than the length of the number of lines being printed.

23. The apparatus of claim 22 wherein the patterns to be printed on each page are N labels, where N is a positive integer.

24. The apparatus of claim 23 wherein a first preset number of lines at the beginning of each label and a second preset number of lines at the end of each label are blank lines.

25. The apparatus of claim 24 wherein the first and second preset numbers equal about one twentieth of an inch.

26. An apparatus for controlling a laser printer engine in response to commands and print data signals provided by a computer representing patterns to be printed by the laser printer engine, said apparatus comprising:
- a pattern memory in which signals representing reference patterns are stored;
- a page memory in which signals representing patterns on a first page to be printed are stored and in which signals representing patterns o second and subsequent pages to be built are stored;
- central processing means, responsive to the commands and print data signals, for selectively storing the reference pattern signals rom the pattern memory into the page memory, wherein said central processing means provides the first page pattern signals stored in the page memory to the laser printer engine for use in printing the first page while simultaneously providing the second page pattern signals from the pattern memory to the page memory to build the second page in the page memory and, after the first page pattern signals have been provided to the laser printer engine, said central processing means provides the second page pattern signals stored in the page memory to the laser printer engine for printing while simultaneously providing the subsequent page pattern signals from the pattern memory to the first page memory to build the subsequent page in the page memory wherein the central processing means includes means for determining the difference between the length of a label being printed by the printer engine and the length of paper being fed by the printer engine as the label is printed and means for adjusting the spacing between the label being printed and the next label to be printed in response to the difference; and
- means for interconnecting the computer and the central processing means, for interconnecting the pattern memory and the page memory, and for interconnecting the page memory and the laser printer engine.

27. The apparatus of claim 26 wherein the means for adjusting comprises means for deleting the difference from the spacing when the length of the paper being fed is greater than the length of the label being printed and means for adding the difference to the spacing when the length of the paper being fed is less than the length of the label being printed.

28. The apparatus of claim 27 wherein a first preset number of lines at the beginning of each label and a second preset number of lines at the end of each label are blank lines.

29. The apparatus of claim 28 wherein the first and second present numbers equal about one twentieth of an inch.

30. An apparatus for controlling a laser printer engine in response to commands and print data signals provided by a computer representing patterns to be printed by the laser printer engine, said apparatus comprising:
- a pattern memory in which signals representing reference patterns are stored;
- a page memory in which signals representing patterns on a first page to be printed are stored and in which signals representing patterns on second and subsequent pages to be built are stored;
- central processing means, responsive to the commands and print data signals, for selectively storing the reference pattern signals from the pattern memory into the page memory, wherein said central processing means provides the first page pattern signals stored in the page memory to the laser printer engine for use in printing the first page while simultaneously providing the second page pattern signals from the pattern memory to the page memory to build the second page in he page memory and, after the first page pattern signals have been provided to the laser printer engine, said central processing means provides the second page pattern signals stored in the page memory to the laser printer engine for printing while simultaneously providing the subsequent page pattern signals from the pattern memory to the first page memory to build the subsequent page in the page memory wherein the central processing means includes means for determining the difference between the length of a label being printed by the printer engine and the length of paper being fed by the printer engine as the label is printed and means for adjusting the length of the label being printed in response to the difference; and
- means for interconnecting the computer and the central processing means, for interconnecting the pattern memory and the page memory, and for interconnecting the page memory and the laser printer engine.

31. The apparatus of claim 30 wherein the means for adjusting comprises means for deleting lines from the label when the length of the paper being fed is greater than the length of the label being printed and means for adding lines to the label and/or to the beginning and/or end of the page on which the label is being printed when the length of the paper being fed is less than the length of the label being printed.

* * * * *

UNITED STATES PATENT AND TRADEMARK OFFICE
CERTIFICATE OF CORRECTION

PATENT NO. : 5,115,493

DATED : May 19, 1992

INVENTOR(S) : Ivan M. Jeanblanc et al.

It is certified that error appears in the above-identified patent and that said Letters Patent is hereby corrected as shown below:

Column 14, claim 21, line 30, "have bee" should read ---have been---.

Column 14, claim 21, line 26, "t  he" should read ---the---.

Column 16, claim 30, line 23, "in he page" should read ---in the page---.

Signed and Sealed this

Seventeenth Day of August, 1993

Attest:

BRUCE LEHMAN

*Attesting Officer*      *Commissioner of Patents and Trademarks*

REEXAMINATION CERTIFICATE (2737th)
United States Patent [19]
Jeanblanc et al.

[11] B1 5,115,493
[45] Certificate Issued Nov. 21, 1995

[54] CONTINUOUS LASER PRINTER FOR PRINTING OVER PAGE BOUNDARIES

[75] Inventors: Ivan M. Jeanblanc, Chesterfield; Stephen E. Hutchison, Manchester; Mark K. Virkus, Manchester; Ronald J. Johnsen, Manchester, all of Mo.

[73] Assignee: DH Technology, Inc., San Diego, Calif.

Reexamination Requests:
No. 90/003,476, Jun. 27, 1994
No. 90/003,538, Aug. 24, 1994

Reexamination Certificate for:
Patent No.: 5,115,493
Issued: May 19, 1992
Appl. No.: 567,839
Filed: Aug. 15, 1990

Certificate of Correction issued Aug. 17, 1993.

Related U.S. Application Data

[63] Continuation-in-part of Ser. No. 541,820, Jun. 21, 1990, abandoned, and a continuation-in-part of Ser. No. 558,036, Jul. 25, 1990, abandoned.

[51] Int. Cl.$^6$ .............................. G06K 15/00; G06F 3/12
[52] U.S. Cl. ........................................... 395/117; 395/116
[58] Field of Search ................... 358/449–450, 358/453, 496, 498; 355/308–311, 313–314, 316–317; 395/105, 111, 115–116, 164–166, 117

[56] References Cited

U.S. PATENT DOCUMENTS

| | | |
|---|---|---|
| 4,377,333 | 3/1983 | Tsuji et al. |
| 4,686,540 | 8/1987 | Leslie et al. |
| 4,706,127 | 11/1987 | Nobuta |
| 4,805,135 | 2/1989 | Ochi et al. |
| 4,870,434 | 9/1989 | Negishi et al. |
| 4,912,490 | 3/1990 | Negoro et al. |
| 4,949,104 | 8/1990 | Negoro et al. |
| 4,963,941 | 10/1990 | Negishi et al. |
| 4,992,958 | 2/1991 | Kageyama et al. |
| 4,998,216 | 3/1991 | Hino et al. |
| 4,998,835 | 3/1991 | Negishi et al. |
| 5,008,710 | 4/1991 | Kobayashi et al. |
| 5,023,631 | 6/1991 | Negishi et al. |
| 5,027,135 | 6/1991 | Negishi et al. |
| 5,041,850 | 8/1991 | Kahoyashi et al. |
| 5,105,227 | 4/1992 | Kitamura et al. |
| 5,115,493 | 5/1992 | Jeanblanc et al. |

OTHER PUBLICATIONS

IBM Pentax Laser Engine Controller System Design Document, Dec. 1989 pp. SI 0855–SI 0869.
Preliminary Data Sheet/CL–GP340/Raster Printer Accelerator (RPX), Jun. 1988, Cirrus Logic.
Application Note AN–GP2/Designing with the Raster Printer Accelerator (RPX™): The RPX–EVL2 Laser Printer Controller Board, Feb. 1989, Cirrus Logic.
Preliminary Data Sheet/CL–GP315/Raster Printer Accelerator (RPX), Mar. 1989, Cirrus Logic.
Advance RPX Product Manual/RPX Family/Raster Printer Accelerator (RPX), May 1989, Cirrus Logic.
Preliminary RPX Product Manual/RPX Family/Raster Printer Accelerator (RPX), Jun. 1989, Cirrus Logic.
IBI Pentax Laser Engine Controller System Design Document, Dec. 1989.
Deposition of Ronald J. Johnsen, Feb. 19, 1994.
Declaration of Frank Agovino Re: Motions for Summary Judgment.
Declaration of Ivan M. Jeanblanc Re: Motions for Summary Judgment.
Memorandum and Opposition to Defendant's Motion for Summary Judgment Re: Invalidity and Unenforceability.
Petition under 37 C.F.R. § 1.102 requesting accelerated examination.
Declaration of Paul Heckel In Support of Defendant's Motions For Summary Judgment.
B. W. Phillips, "Intelligent VLSI controllers give laser printing a boost", Electronic Design, Jul. 14, 1988.

*Primary Examiner*—Arthur G. Evans

[57] ABSTRACT

Central processing unit, responsive to the commands and print data signals, selectively stores the reference pattern signals from a pattern memory into a page memory. The central processing unit provides the first page pattern signal stored in the page memory to the laser printer engine for use in printing the first page while simultaneously providing the second page pattern signals from the pattern memory to the page memory to build the second page in the page memory. After the first page pattern signals have been provided to a laser printer engine, the central processing unit provides the second page pattern signals stored in the page memory to the laser printer engine for printing while simultaneously providing the subsequent page pattern signals from the pattern memory to the first page memory to build the subsequent page in the page memory. A bus interconnects the computer and the central processing unit, the pattern memory and the page memory and the laser printer engine.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–31 are confirmed.

* * * * *